United States Patent
Lassl et al.

(10) Patent No.: US 7,537,273 B2
(45) Date of Patent: May 26, 2009

(54) IMPACT FORCE COUPLING ASSEMBLY

(75) Inventors: Gunnar Lassl, Bohus (SE); Mikael Fermer, Partille (SE); Mikael Bostrom, Angered (SE)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 11/620,418

(22) Filed: Jan. 5, 2007

(65) Prior Publication Data

US 2007/0152474 A1 Jul. 5, 2007

(30) Foreign Application Priority Data

Jan. 5, 2006 (EP) .................... 06000167

(51) Int. Cl.
*B62D 21/15* (2006.01)
(52) U.S. Cl. ................................ 296/187.12
(58) Field of Classification Search ............ 296/29, 296/30, 146.6, 187.12, 193.05, 203.03, FOR. 112, 296/FOR. 113; 293/126
See application file for complete search history.

(56) References Cited

U.S. PATENT DOCUMENTS

| | | | | |
|---|---|---|---|---|
| 3,328,935 A | * | 7/1967 | Peras | 52/630 |
| 4,462,633 A | * | 7/1984 | Maeda | 296/187.12 |
| 5,059,056 A | * | 10/1991 | Banthia et al. | 403/170 |
| 5,388,885 A | * | 2/1995 | Warren | 296/203.03 |
| 5,806,901 A | * | 9/1998 | Tennyson et al. | 293/136 |
| 5,820,204 A | * | 10/1998 | Masuda et al. | 296/187.12 |
| 5,954,390 A | * | 9/1999 | Kleinhoffer et al. | 296/203.01 |
| 6,086,141 A | * | 7/2000 | Masuda et al. | 296/193.1 |
| 6,168,228 B1 | * | 1/2001 | Heinz et al. | 296/187.12 |
| 6,568,745 B2 | * | 5/2003 | Kosuge et al. | 296/193.02 |
| 6,568,747 B2 | * | 5/2003 | Kobayashi | 296/204 |
| 6,604,781 B2 | * | 8/2003 | Uchida | 296/204 |
| 6,951,366 B2 | * | 10/2005 | Tomita | 296/187.08 |
| 7,300,099 B2 | * | 11/2007 | Godfrey et al. | 296/187.12 |
| 7,448,674 B2 | * | 11/2008 | Brunner et al. | 296/193.02 |
| 2002/0153749 A1 | * | 10/2002 | Lee | 296/204 |
| 2005/0023862 A1 | | 2/2005 | Saeki | |
| 2005/0194818 A1 | * | 9/2005 | Odaka et al. | 296/187.12 |
| 2006/0202513 A1 | * | 9/2006 | Matsuda | 296/187.12 |
| 2007/0052260 A1 | * | 3/2007 | Lassl et al. | 296/187.12 |
| 2007/0063543 A1 | * | 3/2007 | Roccato et al. | 296/187.08 |
| 2007/0228776 A1 | * | 10/2007 | Schiebel et al. | 296/187.12 |
| 2008/0093889 A1 | * | 4/2008 | Yao | 296/187.12 |
| 2008/0252101 A1 | * | 10/2008 | Koormann et al. | 296/187.12 |

FOREIGN PATENT DOCUMENTS

EP 55398 A1 * 7/1982
JP 04008677 A * 1/1992

(Continued)

*Primary Examiner*—Glenn Dayoan
*Assistant Examiner*—Paul A Chenevert

(57) ABSTRACT

There is described an impact force coupling assembly operable to couple impact forces from an upright member of a road vehicle to a horizontal transverse member thereof during an impact event. The assembly has a first region and a second region, and is operable to be impinged or captured between the members during the impact event. The assembly includes cavities including dividing walls therebetween, the dividing walls extending along the assembly in a direction from the first region to the second region. Capture of the assembly during the impact event is affected by intrusive deformation of the side walls at the regions of the assembly by portions of the transverse member and the upright member. The coupling assembly is preferably fabricated as a unitary extruded aluminum component. The upright member and the transverse member are preferably a heel-kick and a B-pillar respectively of the vehicle.

19 Claims, 12 Drawing Sheets

FOREIGN PATENT DOCUMENTS

| | | | |
|---|---|---|---|
| JP | 06016153 A | * | 1/1994 |
| JP | 06064561 A | * | 3/1994 |
| JP | 06166384 A | * | 6/1994 |
| JP | 2001 163256 | | 6/2001 |

* cited by examiner

IMPACT FORCE COUPLING ASSEMBLY

CROSS-REFERENCE TO RELATED APPLICATIONS

This application is a continuation of European Patent Application No. EP 006000167.4 titled "Impact Force Coupling Assembly" filed Jan. 5, 2006.

FIELD OF THE INVENTION

The present invention relates to impact force coupling assemblies, for example to assemblies operable to couple impact forces within their associated road vehicles so as to provide protection to occupants of such vehicles during impact events. Moreover, the present invention is also concerned with road vehicles including such impact force coupling assemblies.

BACKGROUND OF THE INVENTION

In comparison to road vehicles manufactured one or two decades ago, contemporary road vehicles are capable of providing their occupants with an enhanced degree of protection during impact events. Such an enhanced degree of protection can be identified in accident statistics such that, despite a continuing increase in road traffic with time, the relative number of accidents involving severe personal injury has been decreasing with time. Such an enhanced degree of protection has been achieved by virtue of a combination of safety features including one or more of: seat belts, airbags, improved seat design, impact crumple zones and judicious inclusion of strengthening structures within vehicles. Moreover, such a combination of safety features has been included while taking into consideration a need to reduce vehicle weight for enhancing fuel economy as well as reducing road vehicle manufacturing costs.

During vehicle design and manufacture, it is known that employing common components for various models of road vehicles is capable of reducing road vehicle design costs as well as simplifying manufacturing of such road vehicles. In a context of the present invention, it is desirable to have available in road vehicle manufacture various impact force coupling assemblies which can be used when adapting a common design of vehicle chassis to various models of vehicle while maintaining a high degree of structural safety for meeting contemporary requirements for occupant impact protection. Design of such assemblies is particularly pertinent when road vehicle side-impact protection is a consideration.

Thus, a technical problem addressed by the present invention is to provide an impact force coupling assembly which is susceptible to being used to couple impact forces in connection with a road vehicle body or chassis, for example in a design of body or chassis common to a plurality of road vehicle models, so as to provide enhanced occupant protection during an impact event, for example a vehicle side impact.

SUMMARY OF THE INVENTION

An object of the present invention is to provide an impact force coupling assembly which can be used to couple impact forces in connection with a road vehicle body or chassis during an impact event.

According to a first aspect of the present invention, an impact force coupling assembly operable to couple impact forces from a substantially upright member of a vehicle to a substantially horizontal transverse member of the vehicle during an impact event is provided. The coupling assembly comprises a first region and a second region, whereby it is operable to be captured or impinged substantially at the regions between the upright member and the transverse member during the impact event to hinder the assembly from being substantially displaced from the transverse member. The coupling assembly further comprises at least one cavity including one or more dividing walls therebetween. The one or more dividing walls extend substantially in a direction from the first region to the second region. The capture of the coupling assembly during the impact event is affected by intrusive deformation of the one or more dividing walls at one or more of the regions of the assembly by one or more portions of at least one of the transverse member and the upright member.

The invention is of advantage in that the coupling assembly included in the vehicle is operable to couple impact forces generated during an impact event for reducing intrusion into the vehicle.

Preferably, the coupling assembly is designed to be fitted into a region between the upright member and the transverse member during manufacture or repair of the vehicle after the members have been incorporated into the vehicle. Such fitting of the coupling assembly is susceptible to expediting manufacture or repair of the vehicle.

Preferably, the assembly is of unitary construction. Such unitary construction is capable of simplifying manufacture of the vehicle as well as reducing a total number of parts required for manufacturing the vehicle.

Preferably, the assembly is fabricated by aluminum extrusion. Aluminum extruding processes have been found by the inventors to be cost effective in comparison to alternative fabrication processes such as metal sheet forming and spot welding.

In the assembly, it is preferable that the at least one cavity is arranged to extend between the regions. Inclusion of the cavities is susceptible to imparting the coupling assembly with sufficient longitudinal rigidity during the impact event for coupling impact forces but nevertheless allowing for a degree of deformation of the ends of the assembly for purpose of capturing the assembly into position during the impact event.

More preferably, in the coupling assembly, one of said regions includes an obliquely formed edge cooperating with a corresponding obliquely formed edge of the transverse member. Such an obliquely formed edge is of benefit for adapting the assembly to function in conjunction with a heel-kick of the vehicle.

More preferably, the at least one cavity in the assembly is defined by dividing walls integral to the assembly, the walls being operable to undergo deformation during the impact event to capture the assembly between the transverse member and the upright member. Such capture is of benefit in preventing the assembly from becoming dislodged during the impact event.

Preferably, the assembly has a cross-sectional profile which is substantially 180° rotationally symmetrical so as to provide for fabrication for left-hand and right-hand versions of the assembly for the vehicle from a common extruded aluminum strip during manufacture. Such symmetry is susceptible to reducing waste generated during manufacture of the coupling assembly.

Preferably, the assembly includes an external feature operable to cooperate with a cover arrangement of the vehicle, the assembly thereby being supportable on the cover arrangement during manufacture or repair of the vehicle prior to the assembly being secured by fasteners to the cover arrangement. The cover arrangement is an integral part of a chassis of the vehicle and is operable to assist to maintain the assembly initially in position during the impact event prior to the assembly being captured between the upright member and the transverse member.

Preferably, the assembly includes a plurality of holes disposed mutually substantially perpendicularly for receiving the fasteners for securing the assembly to the cover arrangement.

Preferably, the assembly includes an obliquely formed edge extending upwardly from a lower portion of the assembly for assisting installation of the assembly to the vehicle, or for assisting removal of the assembly from the vehicle, the obliquely formed edge cooperating with the vehicle to provide an aperture through which electrical cables and/or pipes of the vehicle are susceptible to being routed.

According to a second aspect of the invention, there is provided a method of fabricating an impact force coupling assembly operable to couple impact forces from a substantially upright member of a vehicle to a substantially horizontal transverse member of the vehicle during an impact event. The coupling assembly is defined as having a first and second region, and at least one cavity including one or more dividing walls therebetween. The one or more dividing walls extend substantially in a direction from the first region to the second region. The method comprising the first step of extruding a strip of aluminum having a profile including a plurality of hollow cavities longitudinally along the strip. The second step comprises cutting the strip into sections, wherein each section being such a coupling assembly. Preferably, in the first step, the strip is extruded so that its cross-sectional profile is substantially 180° rotational symmetrical for enabling the strip to be employed for left-hand and right-hand versions of the coupling assembly.

It will be appreciated that features of the invention are susceptible to being combined in any combination without departing from the scope of the invention as defined by the accompanying claims.

DESCRIPTION OF THE DIAGRAMS

Embodiments of the invention will now be described, by way of example only, with reference to the following diagrams wherein.

Figure 1:
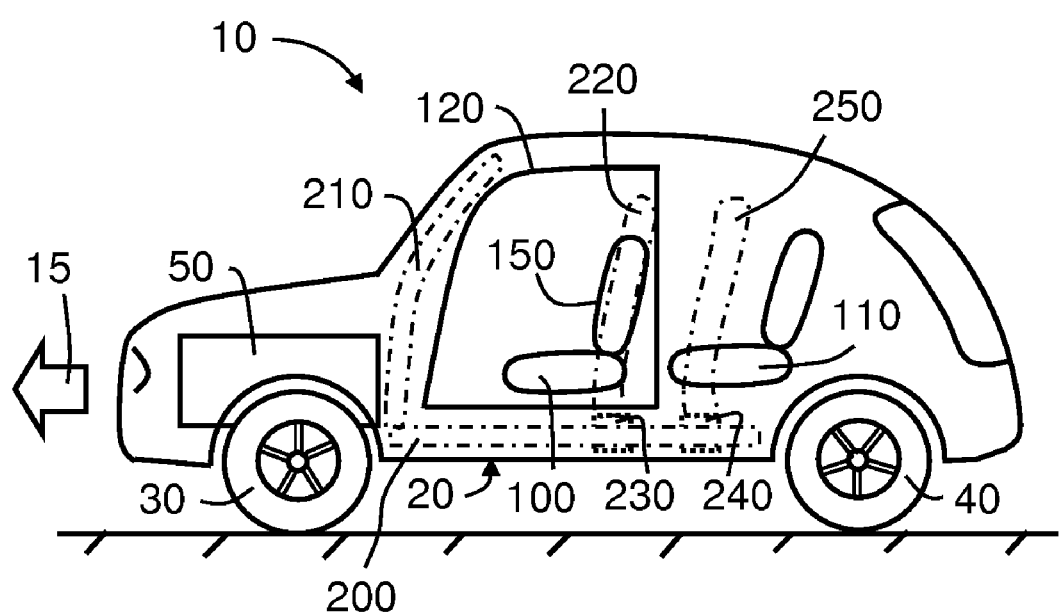
FIG. 1 is a side-view illustration of a road vehicle, the illustration including depictions of various strengthening members included within the vehicle for improving its safety during an impact event.
Figure 3:
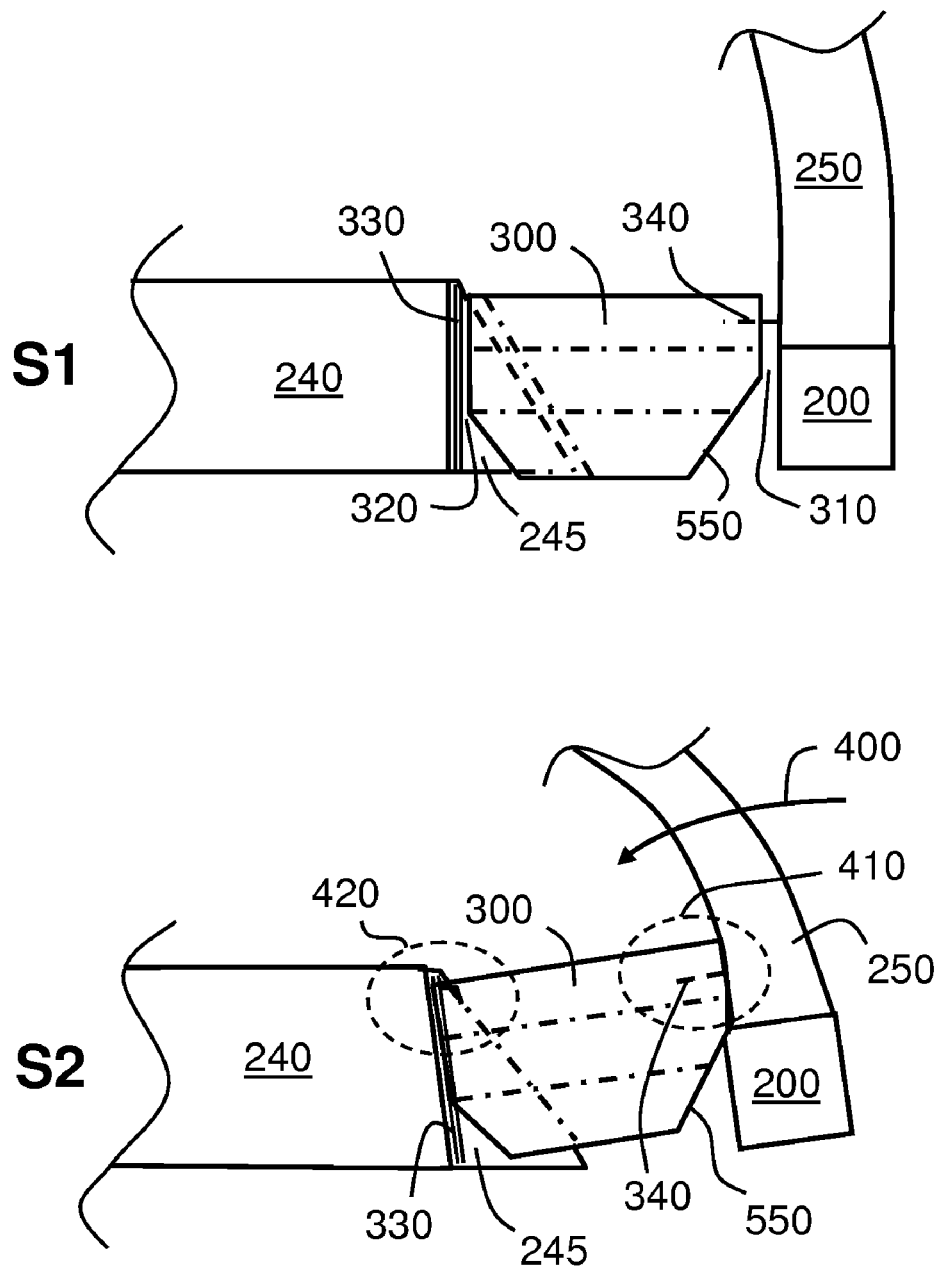
Figure 4A:
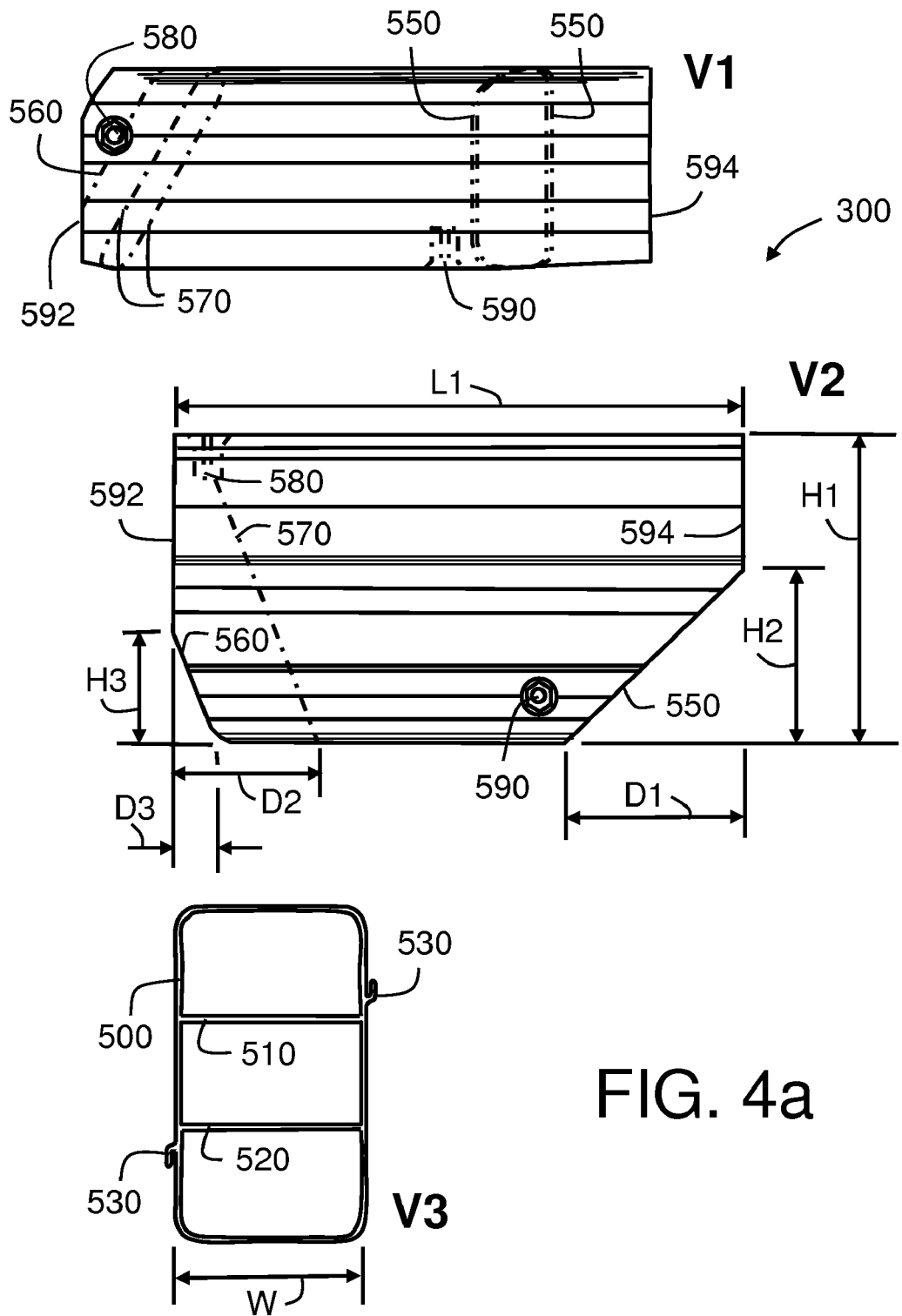
Figure 4B:
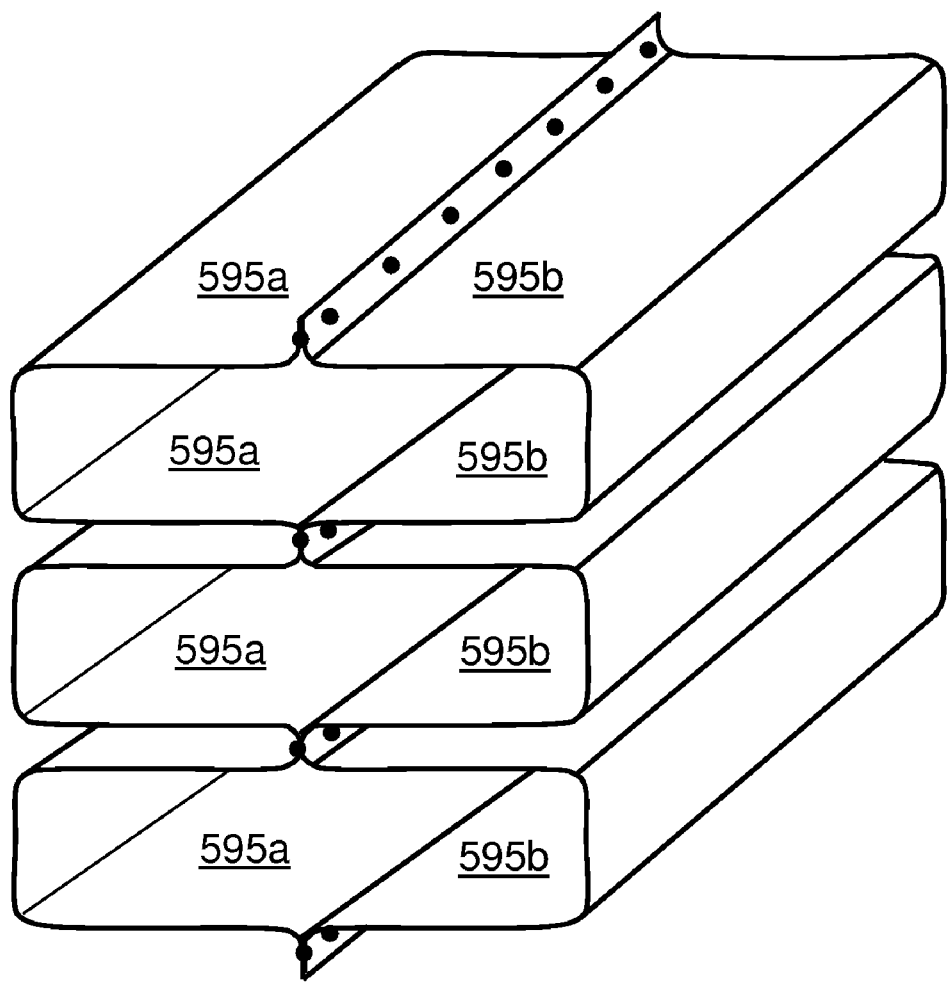
Figure 5:
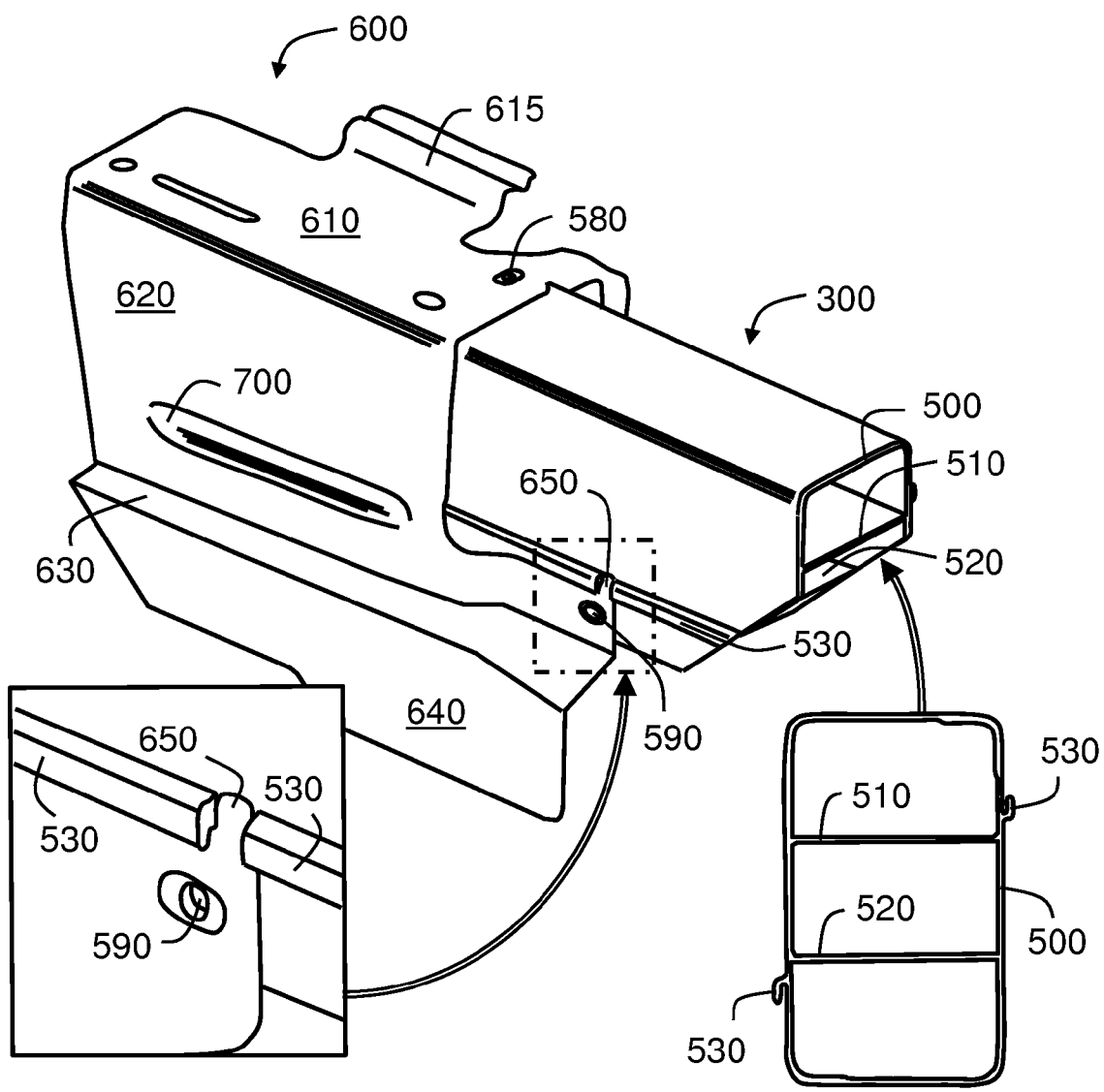
Figure 6A:
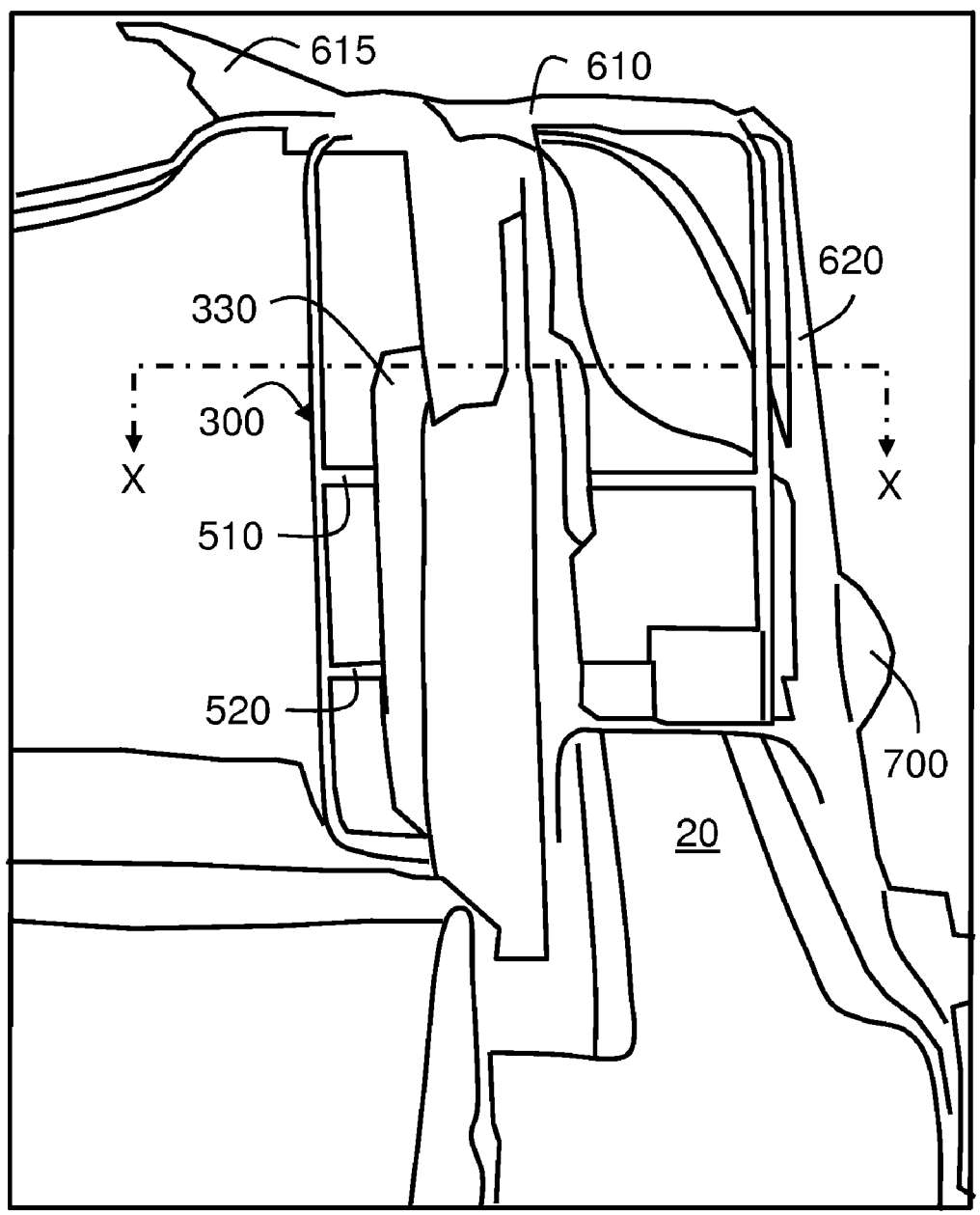
Figure 6B:
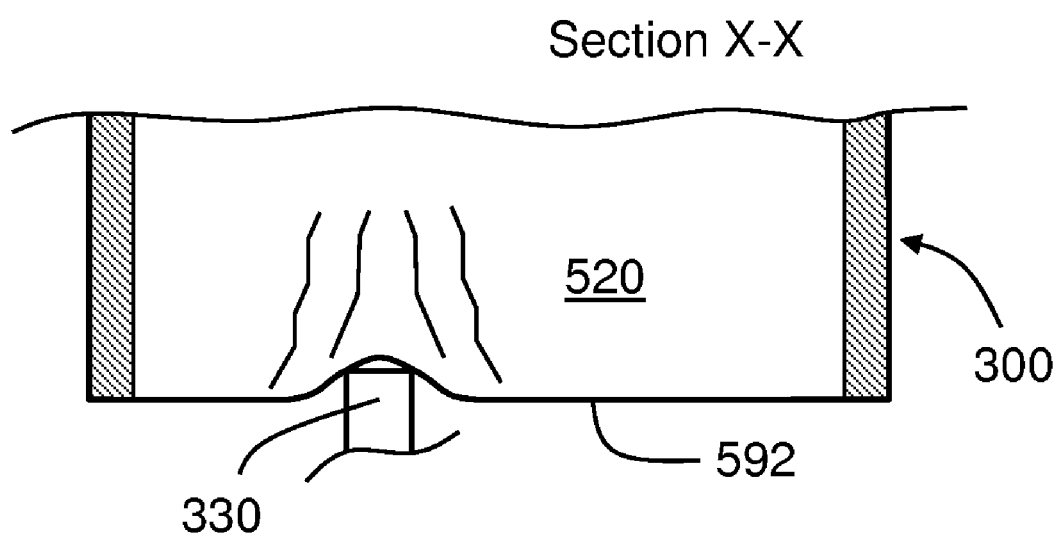
Figure 7:
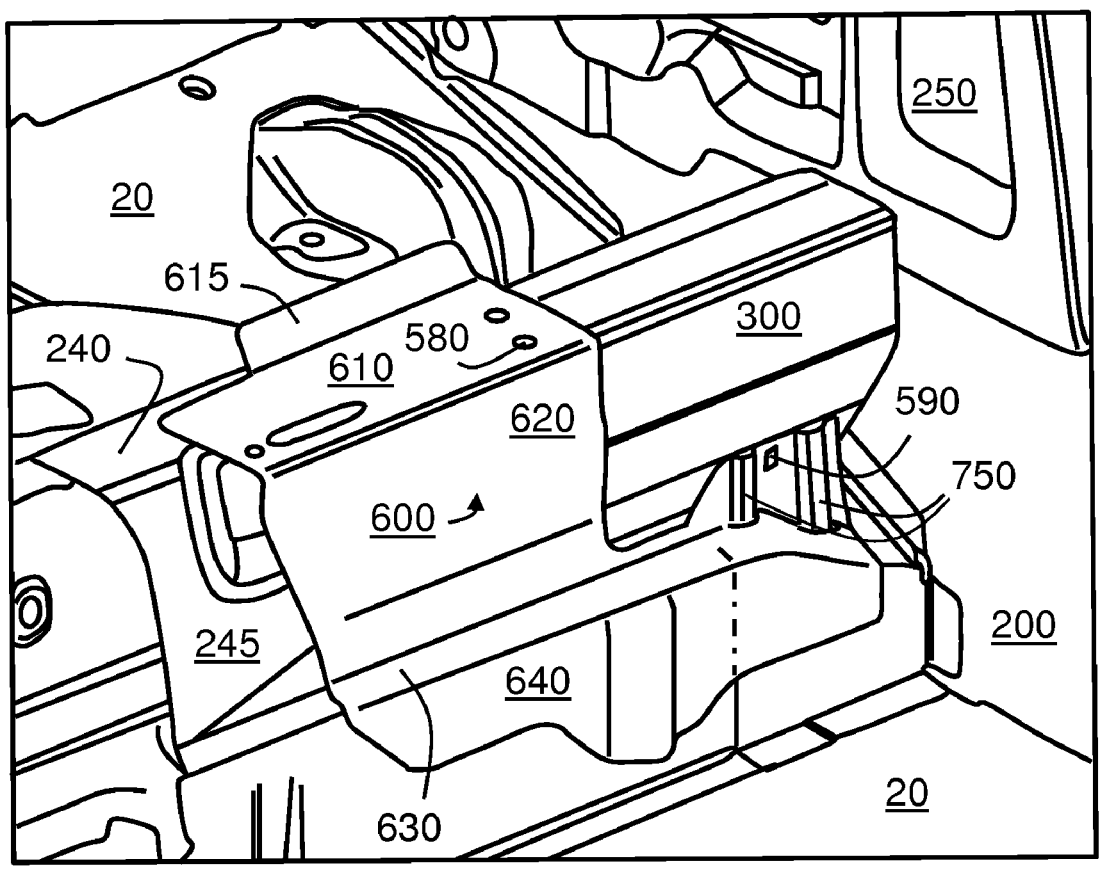
Figure 8:
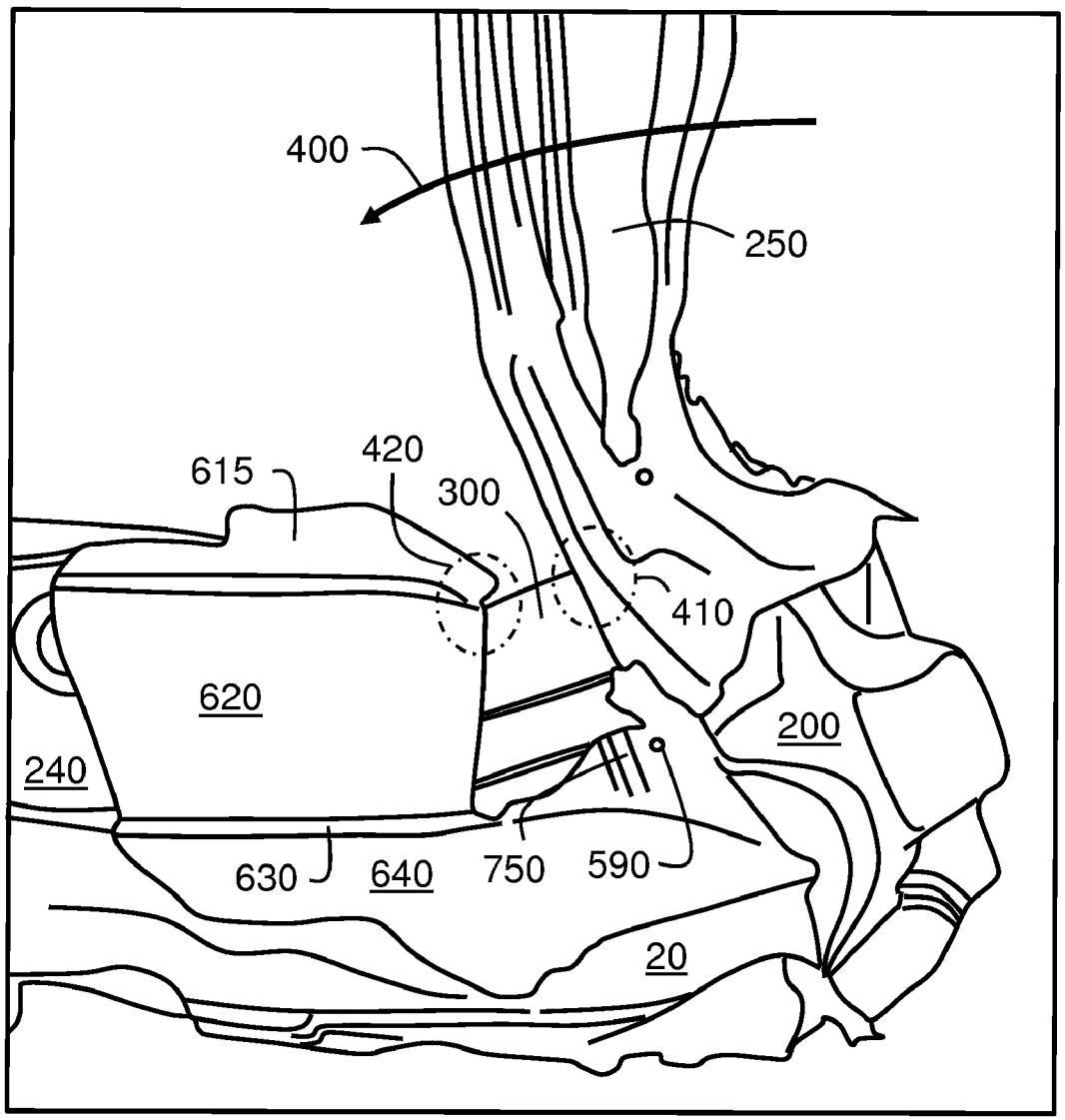
Figure 9:
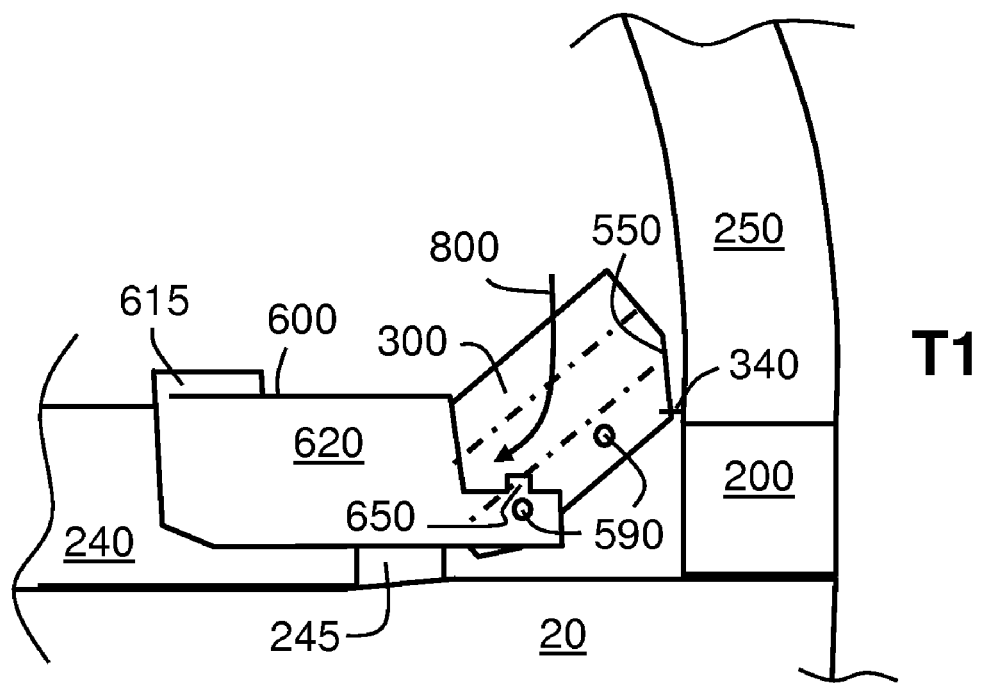
Figure 9:
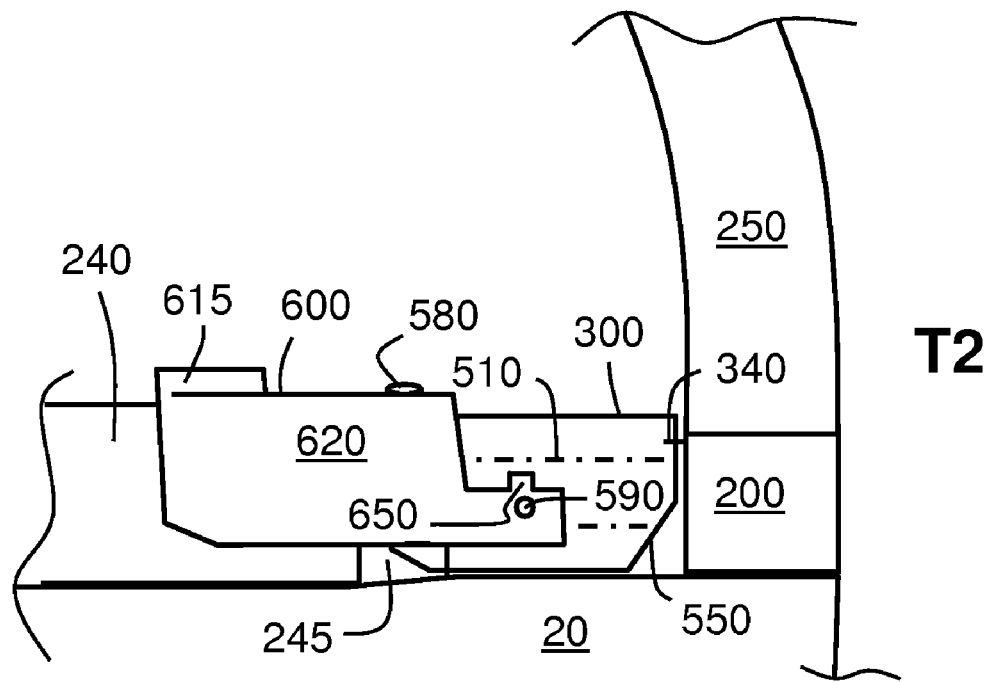

FIG. 3 is an illustration of a transverse member of the vehicle of FIG. 1, the transverse member being known as a "heel-kick", the transverse member being spatially included between B-pillars of the vehicle with impact force coupling assemblies pursuant to the present invention being included between ends of the transverse member and the B-pillars; the illustration depicts capture of one of the force coupling assemblies between its end of the transverse member and its B-pillar, wherein the B-pillar and its associated sill are rotated and distorted in response to impact forces applied thereto;

FIG. 4a includes side-, end- and plan-views of the force coupling assembly illustrated in FIG. 3;

FIG. 4b is an illustration of an alternative embodiment of the assembly of FIG. 3 using preformed metal sheet;

FIG. 5 is an illustration of the force coupling assembly of FIG. 3 located into position in cooperation with its associated cover arrangement;

FIG. 6a is a view substantially along the transverse member of FIG. 3 towards an end plate of the transverse member abutting onto the force coupling assembly shown in FIG. 3; there is included a section line X-X;

FIG. 6b is a sectional view along the section line X-X illustrating embedding of an end plate of the transverse member into the force coupling assembly illustrated in FIG. 6a;

FIG. 7 is an illustration of the force coupling assembly of FIG. 3 installed within the vehicle of FIG. 1 in relation to its associated "heel-kick" and cover arrangement;

FIG. 8 is a view of a part of the illustration of FIG. 7 subject to lateral impact forces; the view depicts the force coupling assembly captured between its associated B-pillar and its associated "heel-kick "; and FIG. 9 is a view of a manner of conveniently and efficiently mounting the force coupling assembly into the vehicle of FIG. 1 during manufacture of the vehicle.

In FIGS. 1 to 9, numerals are included to identify features in conjunction with the following description of embodiments of the invention. The numerals are included underlined when spatially positioned within features to which they relate, for example a number 200 in FIG. 9 is used to represent the aforementioned sill. Moreover, the numerals when not underlined are linked by lines which identify features to which the numerals relate, for example a number 250 linked by a line is employed in FIG. 3 to identify a B-pillar of the aforementioned vehicle. Furthermore, numerals are linked by arrows when they are used to indicate a complete component part; for example a numeral 10 with its associated arrow in FIG. 1 is employed to generally indicate the aforesaid road vehicle, and a numeral 300 with its associated arrow in FIG. 5 is employed to generally indicate the aforesaid force coupling assembly.

DESCRIPTION OF EMBODIMENTS OF THE INVENTION

Embodiments of the present invention will now be described. As described in the foregoing, the present invention concerns an impact force coupling assembly. Spatial location of the force coupling assembly within a road vehicle will firstly be described with reference to FIGS. 1 and 2. Thereafter, operation of the force coupling assembly during an impact event will be described in overview with reference to FIG. 3. Next, an embodiment of the force coupling assembly will be described with reference to FIGS. 4 to 7 including a description of its manner of mounting within the road vehicle of FIG. 1. As a further explanation to FIG. 3, operation of the force coupling assembly will be described with reference to FIG. 8. Finally, an efficient manner of mounting the force coupling assembly into the vehicle of FIG. 1 will be described with reference to FIG. 9.

Referring to FIG. 1, a road vehicle is indicated generally by 10. A forward direction of travel of the vehicle 10 is denoted by an arrow 15; "forward" and "rearward" when describing the vehicle 10 are to be construed with reference to the arrow 15. The vehicle 10 includes a body or chassis indicated by 20; the terms "body" and "chassis" are to be construed to be equivalent terms. Beneficially, as described in the foregoing, the body or chassis 20 is of a design which is substantially common to a plurality of designs of vehicles for increasing manufacturing efficiency. The vehicle 10 includes a pair of front wheels 30, a pair of rear wheels 40, and a front-mounted combustion engine 50 whose drive output is coupled via a transmission arrangement (not shown in FIG. 1) to at least the pair of front wheels 30. The vehicle 10 further includes a pair of front seats 100 and a rear seat arrangement 110. Additionally, the vehicle 10 includes a pair of front doors 120 for accessing at least the pair of front seats 100.

Figure 2A:
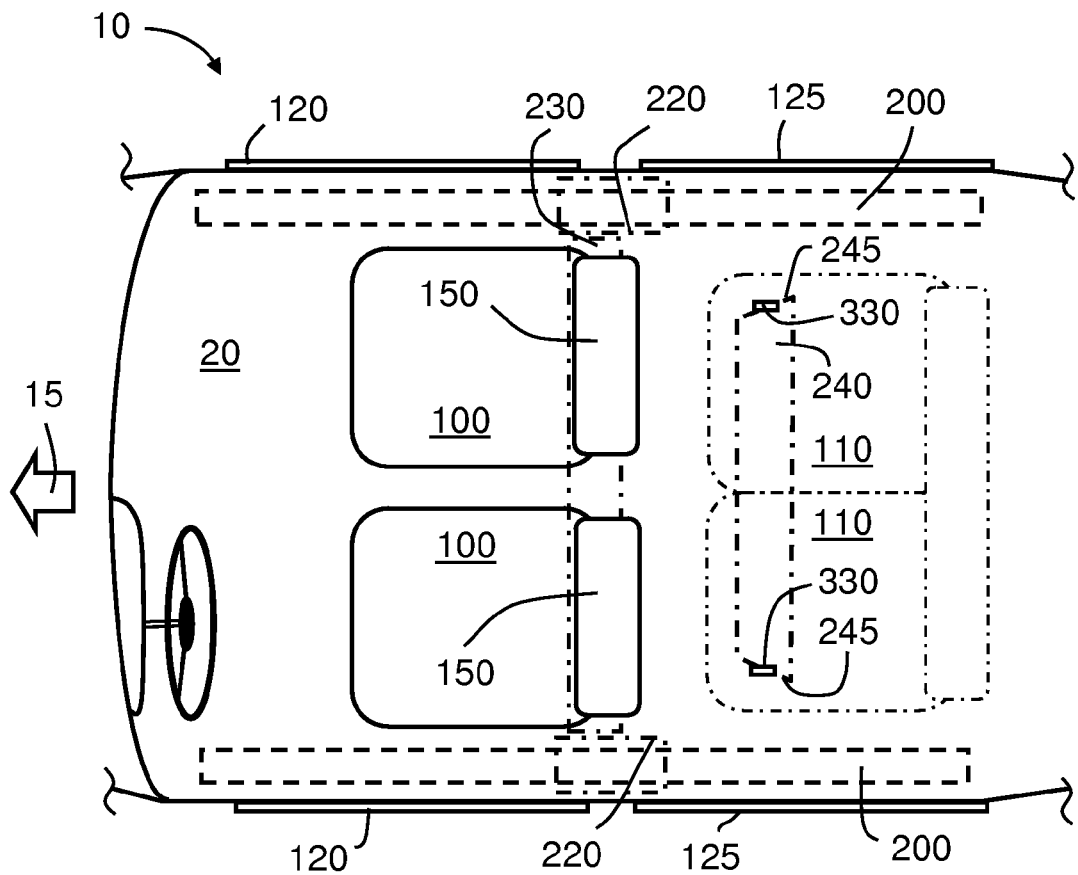
FIGS. 2a and 2b are plan-view illustrations of the vehicle shown in FIG. 1 implemented as four-door and two-door versions respectively.
Figure 2B:
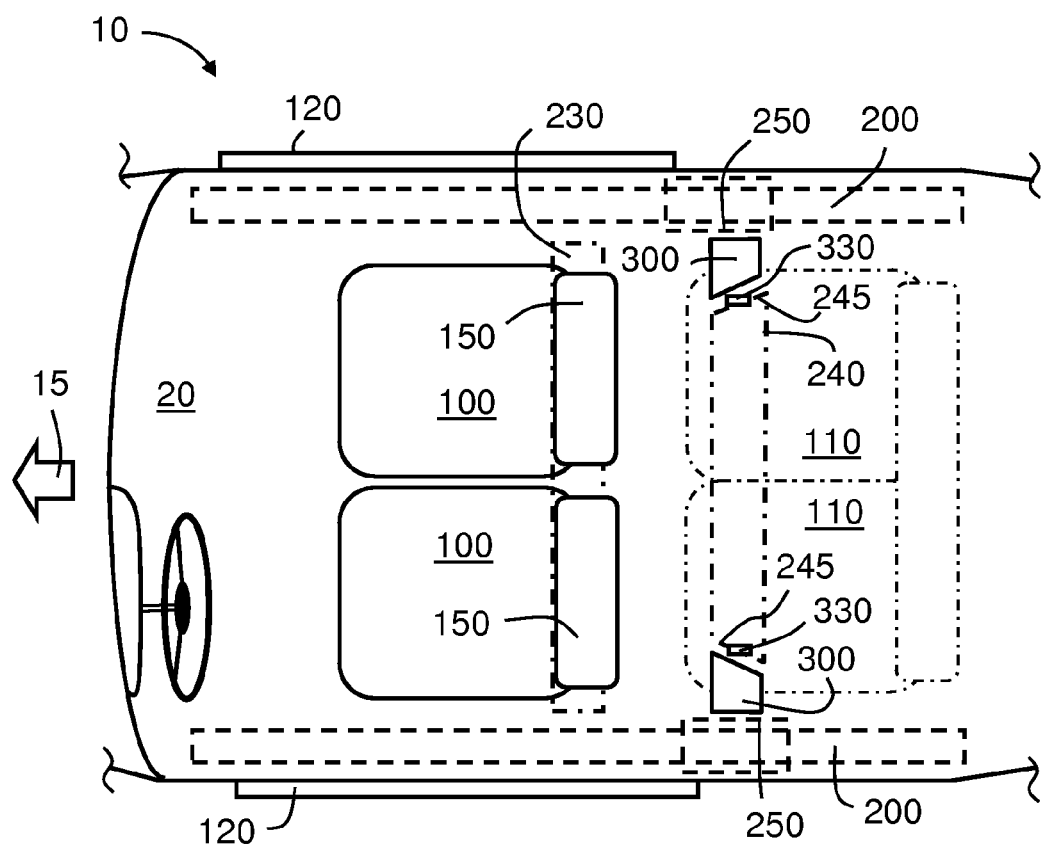

The vehicle 10 is susceptible to being manufactured as a two-door version as depicted in FIG. 2*b*, or as a four-door version as depicted in FIG. 2*a*. When the vehicle 10 is implemented as a two-door version as depicted in FIG. 2*b*, only the pair of front doors 120 are included for user access to the pair of front seats 100 and also the rear seat arrangement 110; conveniently, back rests 150 of the pair of front seats 100 are pivotally mounted at lower regions thereof so that the back rests 150 can be pivoted forward to allow user-access through the pair of front doors 120 to the rear seat arrangement 110.

Conversely, when the vehicle 10 is implemented as a four-door version as depicted in FIG. 2*a*, the back rests 150 of the pair of front seats 100 are not pivotally mounted and the vehicle 10 is additionally provided with a pair of rear doors denoted by 125 to enable user-access to the rear seat arrangement 110.

When manufacturing the vehicle 10, although the body or chassis 20 is employed for both two-door and four-door versions of the vehicle 10, the pair of front doors 120 are conveniently implemented to be of greater width in the two-door version as illustrated in FIG. 2*b*, for easing user-access to the rear seat arrangement 110, relative to their width for the aforesaid four-door version in FIG. 2*a*. Such difference in width of the pair of front doors 120 has implications for a manner in which the vehicle 10 is built up from its body or chassis 20 during manufacture in order to provide a high degree of occupant safety during an impact event.

The body or chassis 20 depicted in FIGS. 1, 2*a* and 2*b* has associated therewith elongate sills 200 on peripheral left and right sides thereof. The sills 200 are orientated in a longitudinal direction in the vehicle 10 from a front region thereof substantially behind the pair of front wheels 30 to a rear region substantially in front of the pair of rear wheels 40. Moreover, the body or chassis 20 includes a first transverse member 230 substantially coincident with the pair of front seats 100 and a second transverse member 240 substantially beneath the rear seat arrangement 110. The second transverse member 240 is included rearward of the first transverse member 230 as illustrated. Conveniently, the second transverse member 240 is referred to as being a "heel-kick". Moreover, the first transverse member 230 is optionally implemented as a side impact protection system (SIPS). In a SIPS, robust elongate strengthening members are included transversely in each of the front seats 100, and are operable to cause the seats 100 to be laterally displaced by impact forces encountered during a side impact event, thereby bearing the impact forces transversely across the vehicle 10. The robust elongate strengthening members are susceptible to be implemented as tubes included within the seats 100.

In the four-door version of the vehicle 10 shown in FIG. 2*a*, a pair of substantially vertically-disposed B-pillars 220 are included substantially aligned as illustrated to ends of the first transverse member 230 and coupled thereto via their respective sills 200, for example by way of welding. The pair of front doors 120 is such case are pivotally mounted to forward A-pillars (shown as 210 in FIG. 1) of the vehicle 10 and are operable to latch substantially onto the pair of B-pillars 220. The pair of rear doors 125 in the four-door version are pivotally mounted substantially to the pair of B-pillars 220 and latch substantially onto C-pillars (not shown) included rearwards in the vehicle 10 relative to the B-pillars 220.

In a two-door version of the vehicle 10 depicted in FIG. 2*b*, a pair of substantially vertically-disposed B-pillars 250 are included coupled to respective sills 200; moreover, only the pair of front doors 120 are included, namely the pair of rear doors are absent. Optionally, the B-pillar 250 can be implemented using several preformed metal sheet components mutually joined together during manufacture. The second transverse member 240 is relatively shorter in length in comparison to the first transverse member 230, namely so that the second transverse member 240 is susceptible to being accommodated beneath the rear seat arrangement 110 in the four-door version of the vehicle 10, gap regions exist between ends of the second transverse member 240, namely the "heel-kick", and the sills 200. In order to provide enhanced occupant safety, especially with regard to a side impact event onto the B-pillars 250, it is desirable to include an impact force coupling assembly in each of the gap regions for ensuring that side impact forces experienced by the B-pillars 250 in a two-door version of the vehicle 10 depicted in FIG. 2*b* are effectively coupled to the "heel-kick", namely the second transverse member 240, so that the B-pillars 250 are structurally stronger to resist being forced into the vehicle 10 and thereby intruding therein during an impact event.

Referring to FIGS. 2*a* and 2*b*, there are shown plan views of a part of the vehicle 10 wherein the second transverse member 240, namely the "heel-kick", is accommodated beneath the rear seat assembly 110 and has angled end faces 245 for conforming to corner contours of the rear seat arrangement 110. For increasing occupant safety in the two-door version depicted in FIG. 2*b*, there are included two impact force coupling assemblies 300 at ends of the second transverse member 240 and respective sills 200. The force coupling assemblies 300 are operable to couple impact forces from the B-pillars 250 to the transverse member 240; optionally, the coupling assemblies 300 are also operable to undergo a degree of structural deformation to absorb at least some impact energy.

Design of the coupling assemblies 300 takes into consideration that the assemblies 300 are operable during an impact event to resist springing away from the B-pillars 250 and also to resist being forced transversely in a glancing manner relative to an elongate axis of the second transverse member 240 by virtue of the angled end faces 245 being present. In other words, the assemblies 300 are operable to be captured between the B-pillars 250 and the second transverse member 240 during a side impact event. Such capture will now be further described with reference to FIG. 3.

In FIG. 3, two steps of capture of one of the assemblies 300 between its B-pillar 250 and its second transverse member 240 are shown. A step S1 corresponds to a pre-impact situation, whereas a step S2 corresponds to a post-impact situation; such impact is to be construed to be a substantially side impact onto the vehicle 10.

In the step S1, the B-pillar 250 is coupled to the sill 200. Moreover, the assembly 300 is included in a region between the sill 200 and a lower portion of the B-pillar 250; and an end of the second transverse member 240.

Gaps 310, 320 are included between ends of the assembly 300 in respect of the transverse member 240 and the sill 200 with its associated B-pillar 250 so as to circumvent problems of abutting faces momentarily mutually contacting causing acoustic noise, namely "rattle" or "chattering", under normal non-impact operating conditions; the gaps 310, 320 are beneficially in a range of 2 mm to 20 mm, and more beneficially substantially 10 mm. The end of the second transverse member 240 facing towards the assembly 300 includes an end plate 330 formed as a bent flange from the end of the second transverse member 240 and thereby integral therewith. The end plate 330 is of a narrower width than a lateral width W of the assembly 300 (see FIG. 4a); the end plate 330 is conveniently referred to as a "contact finger". Moreover, the end plate 330 is susceptible to being regarded as being a portion of an end of the second transverse member 240. The B-pillar 250, alternatively the sill 200, is provided with a projecting metal tongue 340 for engaging into an upper cavity of the coupling assembly 300 as illustrated. A lower edge of the assembly 300 adjacent to the sill 200 is formed to be at an oblique angle so as to provide a triangular unobstructed region through which cables, tubes and other diverse vehicle components can be routed. Although not shown in FIG. 3, a cover arrangement is also provided for assisting to resist the assembly 300 from being dislodged during an impact event. As will be described in greater detail later, the assembly 300 is formed to at least partially spatially cooperate with the angled end face 245.

In the step S2, the B-pillar 250 is subject to a side impact event, for example a side impact with a sports utility vehicle (SUV), causing the B-pillar 250 to rotate as denoted by an arrow 400. In consequence, the B-pillar 250 becomes bent as illustrated and partially intrudes into an interior of the vehicle 10, and the sill 200 is also rotated. During an early stage of the impact event, the metal tongue 340 prevents the assembly 300 from becoming dislodged; during a later stage of the impact event, the B-pillar becomes deformed around the assembly 300, thereby capturing the assembly 300 and further preventing it from becoming dislodged during the impact event. Moreover, during the early stage of the impact event, the aforesaid cover arrangement assists to maintain the assembly 300 in position; during the later stage of the impact event, the assembly end plate 330 of the second transverse member 240 embeds itself into the assembly 300, thereby capturing the assembly 300 relative to the second transverse member 240. Such capture occurs primarily at upper corners of the assembly 300 denoted by 410, 420. During such capturing of the assembly 300 between the B-pillar 250 and the second transverse member 240, the assembly 300 is susceptible to undergoing a limited degree of intrusive deformation, thereby absorbing a portion of impact energy imparted to the vehicle 10 during the impact event.

Referring next to FIG. 4a, there is shown the coupling assembly 300 in greater detail in views V1, V2 and V3 corresponding to top-, side- and end-views respectively. The assembly 300 is fabricated from extruded aluminum profile strip and is thereby a unitary component. The assembly 300 includes a peripheral shell 500 which is internally sub-divided into two outer-cavities and a central-cavity by integral dividing walls 510, 520; the cavities are beneficially of substantially mutually similar cross-sectional area. Moreover, the dividing walls 510, 520 preferably extend at least partially along the assembly 300, more preferably an entire length of the assembly 300 as illustrated. Furthermore, one or more of the cavities are optionally at least partially filled with a filling material; for example, the filling material is beneficially an energy-absorbing crushable plastics material foam. Optionally, one or more of the cavities can be at least partially hollow, namely not filled with material. More optionally, the cavities of the assembly 300 are hollow. Although three cavities are shown, it will be appreciated that the assembly 300 can be modified to include one or more cavities if required; however, three cavities are found to function well for the assembly 300.

The assembly 300 is further provided with two external slot projections 530 longitudinally therealong as illustrated with gaps of the projections 530 directed upwardly and downwardly when the assembly 300 is installed in the vehicle 10. An extruded profile strip employed to form the assembly 300 is intentionally 180° rotationally symmetrical so that right-hand and left-hand versions of the assembly 300 as shown in FIG. 2b can be cut from the same extruded profile strip; thereby, only one type of aluminum aluminum extruding tool is required to be employed to form strip for producing right-hand and left-hand versions of the assembly 300. Moreover, oblique angle cuts applied to the extruded aluminum profile are designed for minimal wastage of material when cutting matching sets of right-hand and left-hand assemblies 300 from the strip; such efficient use of the strip is capable of reducing manufacturing cost of the vehicle 10. Substantially, only a triangle of aluminum material associated with a cut edge 550 is created as waste during manufacture of matching right-hand and left-hand pairs of the assembly 300.

In the view V2, the assembly 300 includes the cut edge 550 at an oblique angle of approximately 45° such that a depth D1 is beneficially substantially 83 mm, and a height H2 is beneficially substantially 77 mm. Moreover, the assembly 300 beneficially can have an overall height H1 of substantially 140 mm. Furthermore, the assembly 300 beneficially has a length L1 of substantially 280 mm. At an end of the assembly 300 remote from the cut edge 550, the assembly 300 includes an angled cut giving rise to obliquely cut edges 560, 570. A depth D3 associated with the cut edge 560 is beneficially substantially 20 mm, and a height H3 is beneficially substantially 49 mm. A depth D2 associated with the cut edge 570 is beneficially substantially 68 mm. The assembly 300 also includes a first screw hole 580 near the cut edge 560 on an upper surface of the assembly 300, and also a second screw hole 590 near the cut edge 550 on a side surface of the assembly 300 as illustrated. Additionally, the assembly 300 can have a width W of substantially 70 mm. A wall thickness of the assembly 300 is beneficially substantially in a range of 2 mm to 5 mm, more preferably substantially 2.5 mm. However, it will be appreciated that dimensions of the assembly 300 are susceptible to being varied in response to impact performance characteristics desired for the vehicle 10. Optionally, the screw holes 580, 590 can be implemented as threaded inserts; alternatively, self-tapping screws can be employed in conjunction with the screw holes 580, 590. For reference, the assembly 300 comprises first and second regions thereof denoted by 592, 594 respectively.

Referring to FIG. 4b, the assembly 300 can alternatively be fabricated from a plurality of preformed metal sheet profiles, for example two sheet steel profiles, which are bonded together, for example by spot welding at mutually abutting interfaces represented by black dots, to generate the three cavities of the assembly 300. In FIG. 4b, the assembly 300 fabricated from two metal sheet profiles 595a, 595b bonded together, for example by spot welding, is illustrated prior to various oblique cuts being implemented to form the aforementioned cut edges 550, 560, 570. The two metal sheet profiles 595a, 595b can alternatively be preformed with the edges 550, 560, 570 already present prior to bonding the sheet profiles 595a, 595b together. However, employing an aluminum extrusion as depicted in FIG. 4a to fabricate the assembly 300 has been found to be most economical and efficient in manufacture in comparison to employing metal sheet profiles, plastics material moldings or similar.

Referring to FIG. 5, the assembly 300 is shown cooperating with its associated cover arrangement indicated generally by 600. The cover arrangement 600 is fabricated from preformed sheet metal, for example 1.2 mm-thick preformed high-strength sheet steel, which is spot welded to the body or chassis 20 and is thereby an integral part of the body or chassis 20. Moreover, the arrangement 600 comprises a top region 610 including a side projection 615 and a hole 580 disposed to locate with the corresponding hole 580 of the assembly 300 when installed as shown. Additionally, the cover arrangement 600 is preformed to comprise a first side region 620 coupled to the top region 610 at one edge thereof, and further preformed to provide a ridge region 630 at another edge thereof as illustrated. The arrangement 600 is further preformed to comprise a second side region 640 extending from the ridge region 630 as illustrated. The arrangement 600 includes an extension derived from a bottom portion of the first side region 620, from the ridge region 630 and from the second side region 640; the extension includes at its remote end a hole 590 disposed to locate with the hole 590 of the assembly 300 when installed as shown.

The extension is substantially rigid and is not intended to be elastically deformable when the assembly 300 is installed into the cover arrangement 600. Moreover, the extension includes a tab 650 which is operable to engage into a channel cut into the external slot projection 530 of the assembly 300 as shown inset; beneficially, an upper edge of the extension preceding the tab 650 engages along the gap of the slot projection 530. The extension is especially useful in that it is capable, by way of a snap fit, of holding the assembly 300 in position onto the chassis 20 while a manufacturing operator installs screws in the holes 580, 590 to secure the assembly 300 more firmly in position onto the body or chassis 20; thus, such holding of the assembly 300 enables the operator to have both of her hands free for installing the screws into the holes 580, 590. The first side region 620 includes an elongate preformed ridge 700 therealong to increase its rigidity.

In FIG. 6a, there is shown a view along the second transverse member 240 illustrating a manner in which the end plate 330 is spatially disposed to engage in operation primarily onto the integral dividing walls 510, 520 in an impact event to capture the assembly 300 in position. Moreover, in the FIG. 6b, distortion of the dividing wall 510 in response to the end plate 330 embedding therein during an impact event is illustrated along a section X-X defined in FIG. 6a. Such embedding of the end plate 330 into the coupling assembly 300 is operable to cause capture of the coupling assembly 300 to the second transverse member 240.

In FIG. 7, the assembly 300 is shown installed within the vehicle 10, namely mounted within the cover arrangement 600 inline with the second transverse member 240 and the B-pillar 250. The aforesaid extension of the arrangement 600 is shown with optional preformed substantially vertical ridges 750 for increasing rigidity of the extension. The B-pillar 250 itself is formed from welded preformed metal sheet which is susceptible to undergoing a degree of crumpling during an impact event to absorb impact energy and also to form itself around the assembly 300 for capturing the assembly 300 in position so that it is operable to effectively couple impact forces to the second transverse member 240. The dividing walls 510, 520 are operable to function as a "bulkhead" during an impact event for effectively engaging the aforementioned end plate 330 formed as a bent flange at the end of the second transverse member 240 into the assembly 300, thus substantially preventing any forward or backward movement of one or more ends or regions 592, 594 of the assembly 300.

FIG. 8 is complementary to the step S2 in FIG. 3 wherein the impact event causes the B-pillar 250 to intrude into an interior of the vehicle 10 as denoted by the aforesaid arrow 400. Whereas the B-pillar 250 crumples during the impact event, the sill 200 is also crumpled and rotated. The assembly 300 is also rotated and is captured principally at its upper corners 410, 420 as illustrated. Moreover, during the impact event, the cover arrangement 600 becomes distorted but nevertheless is successfully operable to support the assembly 300 from undergoing lateral displacement and rotation which could risk the assembly 300 being less effective in coupling impact force from the sill 200 and B-pillar 250 to the second transverse member 240.

Referring finally to FIG. 9, the assembly 300 in conjunction with the cover arrangement 600, as well as providing an impact protection characteristic to occupants of the vehicle 10, is designed for convenient and rapid assembly during manufacture of the vehicle 10. Installation of the assembly 300 within the vehicle 10 is depicted in FIG. 9 by way of installation steps T1 and T2. In the step T1, an end of the assembly 300 is offered underneath the cover arrangement 600 while the assembly 300 is held by the operator at a diagonal angle as illustrated. The cut edge 550 is effective at ensuring that the assembly 300 is susceptible to being rotated into position, as depicted by an arrow 800, so that the assembly 300 is eventually in a substantially horizontal orientation as depicted in the step T2 so that the tab 650 snap locates into the channel formed in the slot projection 530 of the assembly 300, and the assembly 300 is supported on an upper edge of the aforesaid extension of the cover arrangement 600. The holes 580, 590 of the assembly 300 are thereby aligned and the assembly 300 is self-supporting in position onto the cover arrangement 600. Thereafter, the operator is able to install screws into the holes 580, 590 to secure the assembly 300 in respect of the cover arrangement 600 and thereby in respect of the body or chassis 20 and its associated second transverse member 240.

Implementation of the assembly 300 is not only of benefit in enabling the body or chassis 20 to be used for two-door and four-door versions of the vehicle 10, but also provides effective impact protection and allows for convenient and rapid manufacture of the vehicle 10. Moreover, such mounting of the assembly 300 is also of benefit when repairing the vehicle 10 after an impact event as installation time can be reduced.

It will be appreciated that modifications to embodiments of the invention described in the foregoing are possible without departing from the scope of the invention as defined by the accompanying claims.

Although the assembly 300 is described in the foregoing as being fabricated from extruded aluminum, it is susceptible, with appropriate dimensional adjustments, to being fabricated from plastics materials and also from reinforced composites. However, such alternative ways of fabricating the assembly 300 have been found by the inventors to be potentially more costly and complex than aluminum extrusion.

The assembly 300 is described in the foregoing as being operable to couple impact forces between the upright member 250 and the second transverse member 240. It is however to be appreciated that the assembly 300 is susceptible to being used in other parts of the vehicle 10, for example in conjunction with the first transverse member 230.

Reference numerals included within parentheses in the claims are intended to assist understanding of the subject matter claimed in the claims, and are not to be construed to be limiting the scope of the claims. Reference to the singular is also to be construed to relate to the plural.

Terms used in describing and claiming the present invention such as "include", "comprise", "consist of", "have", "are", "incorporate", are to be construed in a non-exclusive manner, namely to allow for other parts or components to be present which are not explicitly indicated.

The invention claimed is:

1. An impact force coupling assembly operable to couple impact forces from a substantially upright member of a vehicle to a substantially horizontal transverse member of the vehicle during an impact event, the coupling assembly comprises:
   a first region and a second region, whereby the coupling assembly is operable to be captured substantially at the regions between the upright member and the transverse member during the impact event to hinder the assembly from being substantially displaced from the transverse member; and
   at least one cavity including one or more dividing walls therebetween, the one or more dividing walls extending substantially in a direction from the first region to the second region;
   wherein the coupling assembly is configured so that the capture during the impact event is affected by intrusive deformation of the one or more dividing walls at one or more of the regions of the assembly by one or more portions of at least one of the transverse member and the upright member;
   wherein the assembly includes an obliquely formed edge extending upwardly from a lower portion of the assembly for assisting installation of the assembly to the vehicle or for assisting removal of the assembly from the vehicle, the obliquely formed edge cooperating with the vehicle to provide an aperture through which electrical cables or pipes of the vehicle can be routed.

2. A coupling assembly as claimed in claim 1, wherein the coupling assembly is designed to be fitted into a region between the upright member and the transverse member during manufacture or repair of the vehicle after the members have been incorporated into the vehicle.

3. A coupling assembly as claimed in claim 1, the assembly having a cross-sectional profile which is substantially 1800 rotationally symmetrical so as to provide for fabrication for left-hand and right-hand versions of the assembly for the vehicle from a common extruded aluminum strip during manufacture.

4. A coupling assembly as claimed in claim 1, wherein the assembly is operable to transfer impact forces during the impact event when the transverse member is a heel-kick of the vehicle and the upright member is a B-pillar of the vehicle.

5. A coupling assembly as claimed in claim 1, the assembly being of unitary construction.

6. A coupling assembly as claimed in claim 5, the assembly being fabricated by aluminum extrusion.

7. A coupling assembly as claimed in claim 1, the assembly including an external feature operable to cooperate with a cover arrangement of the vehicle, the assembly thereby being supportable on the cover arrangement during manufacture or repair of the vehicle prior to the assembly being secured by fasteners to the cover arrangement.

8. A coupling assembly as claimed in claim 7, wherein the assembly includes a plurality of holes disposed mutually substantially perpendicular for receiving the fasteners for securing the assembly to the cover arrangement.

9. A coupling assembly as claimed in claim 1, wherein the coupling assembly is incorporated into a road vehicle.

10. A coupling assembly as claimed in claim 9, wherein the coupling assembly is designed to be fitted during manufacture or repair in a region between the upright member and the transverse member after the members have been incorporated into the road vehicle.

11. A coupling assembly as claimed in claim 10, wherein the transverse member is a heel-kick of the road vehicle, and the upright member is a B-pillar of the road vehicle.

12. A coupling assembly as claimed in claim 1, wherein the at least one cavity is arranged to extend between the first and second regions.

13. A coupling assembly as claimed in claim 12, wherein one of the regions includes an obliquely formed edge for cooperating with a corresponding obliquely formed edge of the transverse member.

14. A coupling assembly as claimed in claim 12, wherein the at least one cavity in the assembly is defined by dividing walls integral to the assembly, the walls being operable to undergo deformation during the impact event to capture the assembly between the transverse member and the upright member.

15. A method of fabricating an impact force coupling assembly operable to couple impact forces from a substantially upright member of a vehicle to a substantially horizontal transverse member of the vehicle during an impact event, the coupling assembly having a first and second region, and at least one cavity including one or more dividing walls therebetween, the one or more dividing walls extending substantially in a direction from the first region to the second region, the method comprising the steps of: extruding a strip of aluminum having a profile including a plurality of hollow cavities longitudinally along the strip; cutting the strip into sections, each section being such a coupling assembly; and
   forming a screw hole for pivotally fastening the coupling assembly to the substantially horizontal transverse member.

16. A method as claimed in claim 15, wherein the strip is extruded so that the cross-sectional profile of the strip is substantially 180° rotational symmetrical for enabling the strip to be employed for left-hand and right-hand versions of the coupling assembly.

17. A side-impact crash absorption assembly for use in a motor vehicle, comprising:
   a first substantially transverse member;
   a second vertical pillar member positioned substantially perpendicularly with respect to the first member; and
   a coupling in the first member, wherein the coupling includes a plurality of deformable walls and wherein the coupling is configured to pivot the first member with respect to the second member.

18. The assembly of claim 17, further comprising a cover attached to the first member, wherein the coupling can be fastened to the first member by the cover.

19. The assembly of claim 17, wherein the deformable walls in the coupling are configured to extend between the first and second member.

* * * * *